United States Patent [19]

Takeda et al.

[11] Patent Number: 4,475,218
[45] Date of Patent: Oct. 2, 1984

[54] CARRIER-RECOVERY CIRCUIT

[75] Inventors: Koichiro Takeda, Abiko; Tokihiro Miyo, Kawasaki, both of Japan

[73] Assignee: Fujitsu Limited, Kawasaki, Japan

[21] Appl. No.: 452,921

[22] Filed: Dec. 27, 1982

[30] Foreign Application Priority Data

Dec. 28, 1981 [JP] Japan .................. 56-212775

[51] Int. Cl.³ .................. H03D 3/24; H04L 27/22
[52] U.S. Cl. .................. 375/81; 375/83; 375/97; 375/120; 329/50; 329/124
[58] Field of Search .................. 375/52, 81, 83, 94, 375/97, 119, 120; 455/260, 265; 329/50, 124

[56] References Cited

U.S. PATENT DOCUMENTS

| | | | |
|---|---|---|---|
| 4,100,499 | 7/1978 | Monrolin | 375/81 |
| 4,143,322 | 3/1979 | Shimamura | 375/81 |
| 4,338,574 | 7/1982 | Fujita et al. | 329/50 |
| 4,344,178 | 8/1982 | Waters | 375/81 |

Primary Examiner—Jin F. Ng
Attorney, Agent, or Firm—Staas & Halsey

[57] ABSTRACT

In the base-band carrier-recovery circuit used in the demodulator of radio equipment using a PSK modulated signal, a first doubled signal (sin $2\theta$) is obtained by using first and second outputs (sin $\theta$, cos $\theta$) in-phase quadrature with each other from an in-phase quadrature detecting means. A second doubled signal (cos $2\theta$) having a phase difference of 90 degrees from the first doubled signal (sin $2\theta$) is obtained by fullwave rectifying the second output (cos $\theta$) and transforming the output waveform. Thereafter a quadrupled signal (sin $4\theta$) is generated from the first and second doubled signals. The quadrupled signal is then fed back to a VCO via a loop filter, thereby recovering the reference carrier signal which is in phase with the received PSK modulated signal.

6 Claims, 3 Drawing Figures

CARRIER-RECOVERY CIRCUIT

BACKGROUND OF THE INVENTION

This invention relates to a carrier-recovery circuit and particularly to a baseband carrier-recovery circuit for use in the demodulator of multiplex radio equipment utilizing four (4) levels of phase shift keying modulation.

The carrier recovery system utilizing the non-linear operation (logical treatment) in the baseband frequency is generally called the COSTAS system because a phase lock loop called a COSTAS loop is used. In the COSTAS system, signals from respective circuits are processed in the base-band frequency and therefore the system can be realized easier than other systems which processing the signals in a higher frequency range.

For example, one of the COSTAS systems will be explained, referring to an example of recovery of the reference carrier signal from the four (4) levels of a modulated PSK signal.
  (i) The four (4)-level modulated PSK input signal is branched in two directions and is respectively mixed with the reference carrier signal having a phase difference of 90 degrees, for the purpose of in-phase quadrature detection.
  (ii) A first doubled signal (sin $2\theta$) is generated from the baseband signals (sin $\theta$, cos $\theta$), having the phase difference of 90 degrees, sent from the in-phase quadrature detecting means.
  (iii) In a same way, the second doubled signal (cos 2), having a phase difference of 90 degrees from said first doubled signal, is generated from the baseband signals.
  (iv) A quadrupled signal (sin $4\theta$) is generated from the first and second doubled signals.
  (v) Since the phase modulated components which are applied to the four phases of the reference carrier signal can be eliminated by generating a quadrupled signal, the reference carrier signal can be obtained by using the quadrupled signal for oscillation control of a VCO (Voltage Controlled Oscillator) via the loop filter.

The process for generating the first doubled signal (sin $2\theta$) explained in item (ii) above, that is, the method of inputting respectively the two outputs (sin $\theta$, cos $\theta$) of the quadrature detecting means into the exclusive-OR (EX-OR) gate circuit, is known. The equation (1) indicated below is used.

$$\sin \theta \cos \theta + \sin \theta \cos \theta = \sin \theta \cos \theta = \tfrac{1}{2} \sin 2\theta \qquad (1)$$

In addition, the process for obtaining the second doubled signal (cos $2\theta$) having the phase difference of 90 degrees from the first doubled signal as indicated in item (iii) above, that is, the method for obtaining the square values of the outputs of the respective quadrature detecting means (or full-wave rectifying circuit) and thereafter extracting a difference between the second doubled signal and the first doubled signal, is also know. The equation (2) indicated below is used.

$$(\sin \theta)^2 - (\cos \theta)^2 = \cos 2\theta \qquad (2)$$

The succeeding process for obtaining the quadrupled signal (sin $4\theta$) is explained in item (iv) above, and the EX-OR of the first and second doubled signals are obtained as in item (ii) above.

As explained above, the method for obtaining the first doubled signal (sin $2\theta$) and the quadrupled signal (sin $4\theta$) can be realized easily with a simple structure using the EX-OR gate circuit, but a plurality of square circuits (or full-wave rectifying circuit) and a subtraction (or addition) circuit is needed in order to obtain the second doubled signal (cos $2\theta$), complicating the circuit structure.

SUMMARY OF THE INVENTION

It is an object of this invention to provide a carrier-recovery circuit which assures high performance and high stability with a simple circuit structure.

In the present invention, the first doubled signal (sin $2\theta$) is obtained using the first and second outputs (sin $\theta$, cos $\theta$) in-phase quadrature with each other from the in-phase quadrature detecting means, and using a full-wave rectified value of the second output (cos $\theta$). The second doubled signal (cos $2\theta$), which is different in phase by 90 degrees from the first doubled signal (sin $2\theta$), is obtained by waveform conversion. The specified quadrupled signal (sin $4\theta$) is obtained from the first and second doubled signal. Thus, the reference carrier signal, which is in phase with the received PSK modulated signal, can be recovered by operating the VCO with the quadrupled signal.

DESCRIPTION OF THE PREFERRED EMBODIMENT

The preferred embodiment of this invention will be explained with reference to the drawings.

Figure 1:
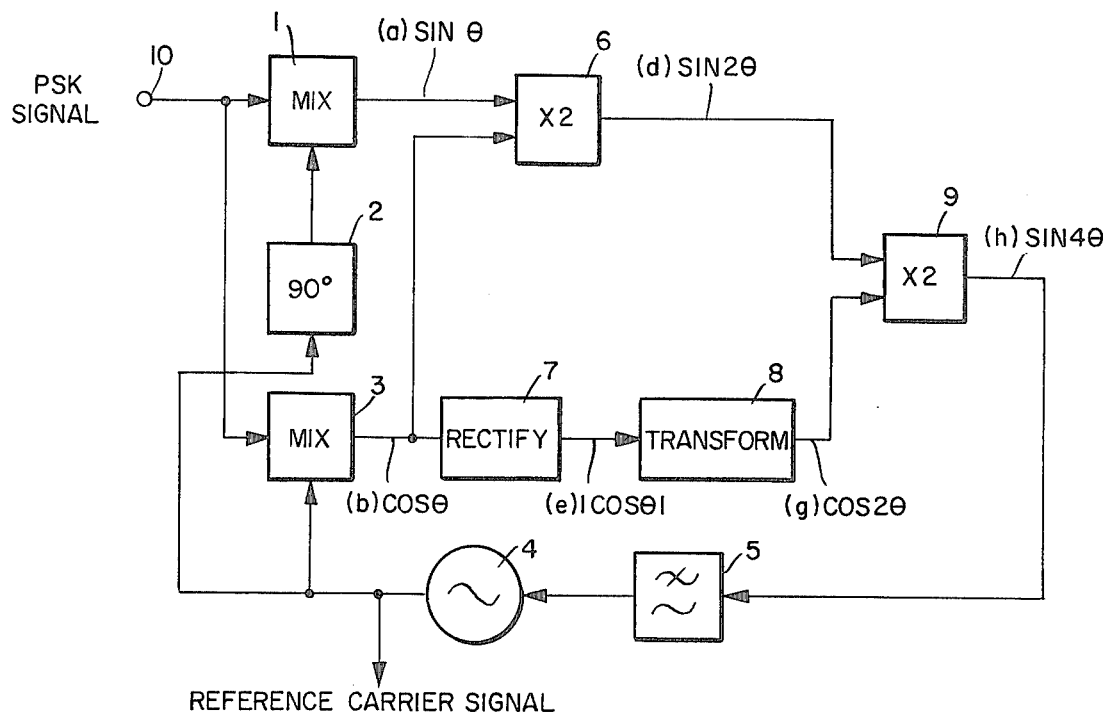
FIG. 1 is a block diagram of a carrier-recovery circuit in an embodiment of the present invention.
Figure 3:
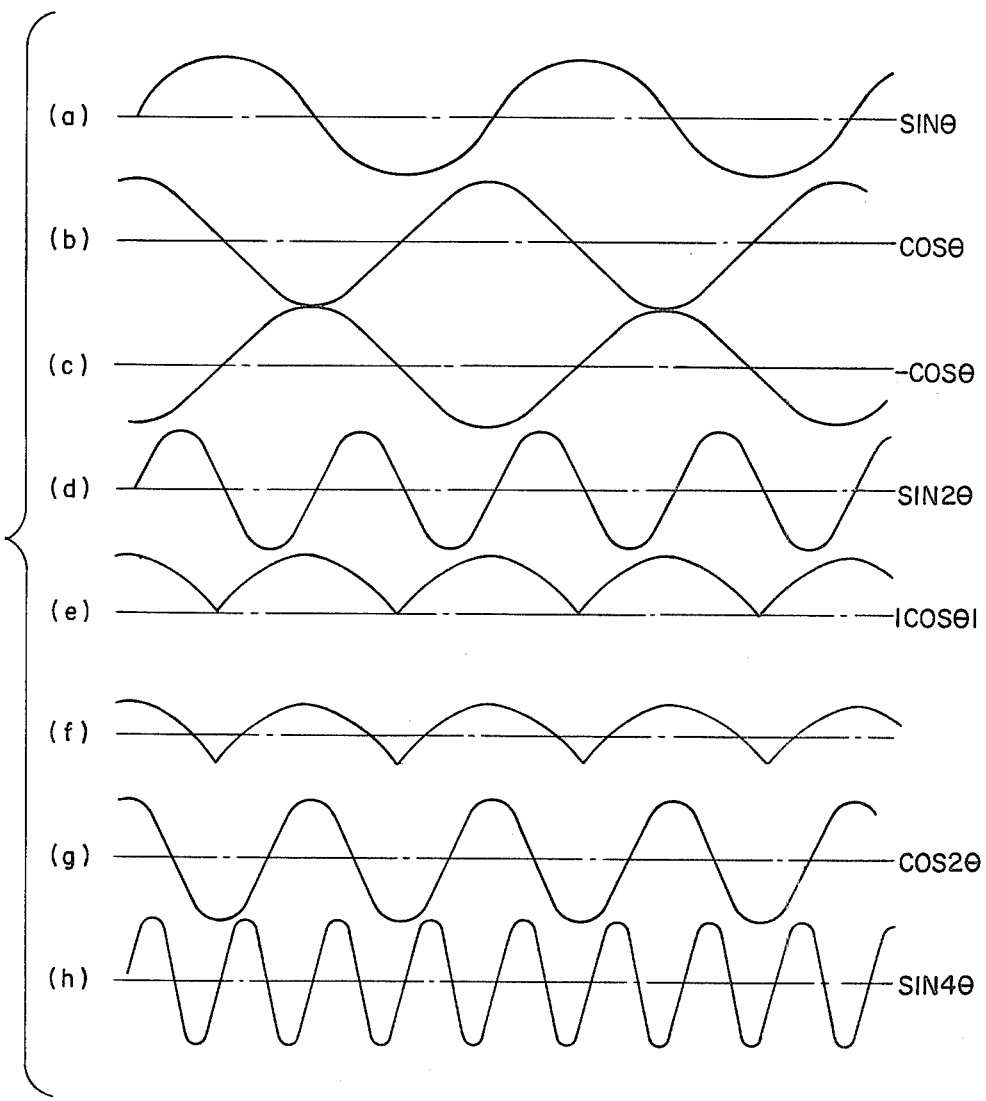
FIG. 3 shows the input/output signal waveforms appearing at principal portions of the carrier-recovery circuits shown in FIG. 1 and FIG. 2.

FIG. 1 is a block diagram of an embodiment of the present invention. In FIG. 1, 1 and 3 are mixers; 2 is a 90° phase-shifter; 4 is a voltage controlled oscillator (VCO); 5 is a loop filter; 6 is a first multiplier means ($\times 2$); 7 is a full-wave rectifying means; 8 is a waveform conversion means; 9 is a second multiplier means ($\times 2$).

The four (4)-level PSK modulated signal input from the input terminal 10 is branched in two directions and then input, respectively, to the mixing means 1 and 3. The phase difference between the input four (4)-level PSK modulated signal and the reference carrier signal generated by the VCO 4 is considered as $\theta$. The in-phase quadrature detection is carried out by the first mixing means 1, the second mixing means 3 and the 90° phase shifter. As a result, an output proportional to sin $\theta$ is generated by the first mixing means and an output proportional to cos $\theta$ is generated by the second mixing means 3. The waveforms of these outputs are proportional to sin $\theta$ and cos $\theta$ and are shown in FIG. 3 (a) and (b).

Then the signals sin $\theta$ and cos $\theta$ are respectively input to the first multiplier means ($\times 2$) 6 and sin $2\theta$ is obtained (FIG. 3d). As described below, the first multiplier means 6, can be formed by an EX-OR gate circuit and the other known circuit elements, thereby having a simplified structure.

The signal cos θ output from the second mixing means is input to the full-wave rectifying circuit 7 and its absolute value is obtained (FIG. 3e). The absolute value of cos θ is considered to be equivalent to the calculation of the square value of cos θ and the component of cos 2θ can be extracted as explained by the following equation (3).

$$\cos 2\theta = \tfrac{1}{2}(1+\cos 2\theta) \quad (3)$$

The waveform transforming means 8 shifts the level of the output signal proportional to $\tfrac{1}{2}(1+\cos 2\theta)$ and provides an output proportional to cos 2θ by boosting the amplitude (FIG. 3g).

The output sin 2θ from the first multiplier means (×2) 6 and the output cos 2θ from the waveform transforming means 8 are input to the second multiplier means (×2) 9, wherein the quadrupled signal sin 4θ is generated from the doubled signals sin 2θ and cos 2θ, having a phase difference of 90 degrees between them, by an operation similar to that of the first multiplier means (×2) 6 (FIG. 3h).

In the case of the four (4)-level PSK modulated signal, carrier phases are shifted in four steps by π/2 for each modulation. Therefore, the phase modulation component can be eliminated by obtaining the quadrupled signal of the input signal.

The carrier, in-phase with the received PSK modulated signal, can be recovered by feeding back the sin 4θ component from the second multiplier means (×2) 9 to the VCO 4 via the loop filter 5 formed by a low-pass-filter.

The detailed structure of the carrier-recovery circuit of in FIG. 1 is explained with reference to FIG. 2.

As in the case of FIG. 1, the outputs proportional to sin θ and cos θ can be obtained by the in-phase quadrature detection of the four (4)-level PSK modulated signal received from the input terminal 10.

The sin θ output from the mixing means 1 is amplified by the differential amplifier 11 and then input to a first input terminal of the EX-OR gate circuit 63 via of level adjusting resistor 61. In the same way, the cos θ output from the mixing means 3 is amplified by the differential amplifier 75 and then input to a second input terminal of the EX-OR gate circuit 63 via a level adjusting resistor 62. As the EX-OR gate circuit 63, an ordinary logic circuit is used, for example, Emitter Coupled Logic (MC1672L). The EX-OR gate circuit judges input signals depending on the threshold level determined by each circuit. The resistors 61 and 62 are inserted for matching an output level of the differential amplifier 11 to the threshold levels of the EX-OR gate circuit 63 and the resistance value is determined accordingly.

As is well known, an output of the EX-OR gate circuit 63 is a square wave being in-phase with sin 2θ, but this circuit operates in response to a rising edge (or falling edge) and can be considered equivalent to sin 2θ shown in FIG. 3d.

Meanwhile, the output cos θ, from the second mixing means 3, is amplified by the differential amplifier 75 and the waveform shown in FIG. 3b is obtained. Simultaneously an inverted output −cos θ as shown in FIG. 3c is also obtained.

The outputs cos θ, −cos θ of the differential amplifier are respectively rectified by rectifying diodes 73 and 74 via level adjusting resistors 71 and 72. The rectifying diodes 73 and 74, respectively, carry out only half-wave rectification of the input signal but the full-wave rectifying output |cos θ| is obtained as a result of combining the two half-wave rectified outputs which are 90 degrees out of phase with respect to each other (FIG. 3e). The output cos θ is level-shifted by a resistor 81 for level adjustment and for example, is matched to the threshold level of the Emitter Couple Logic (FIG. 3f).

The full-wave rectified and level-shifted output signal cos 2θ is amplified by an amplifier means 82 and is input to an EX-OR gate circuit 91 together with the output sin 2θ from the EX-OR gate circuit 63 (FIG. 3g).

The output sin 4θ from the EX-OR gate circuit 91 is input to the VCO 4 via the loop filter 5 as in the case of FIG. 1 and the carrier is recovered.

Figure 2:
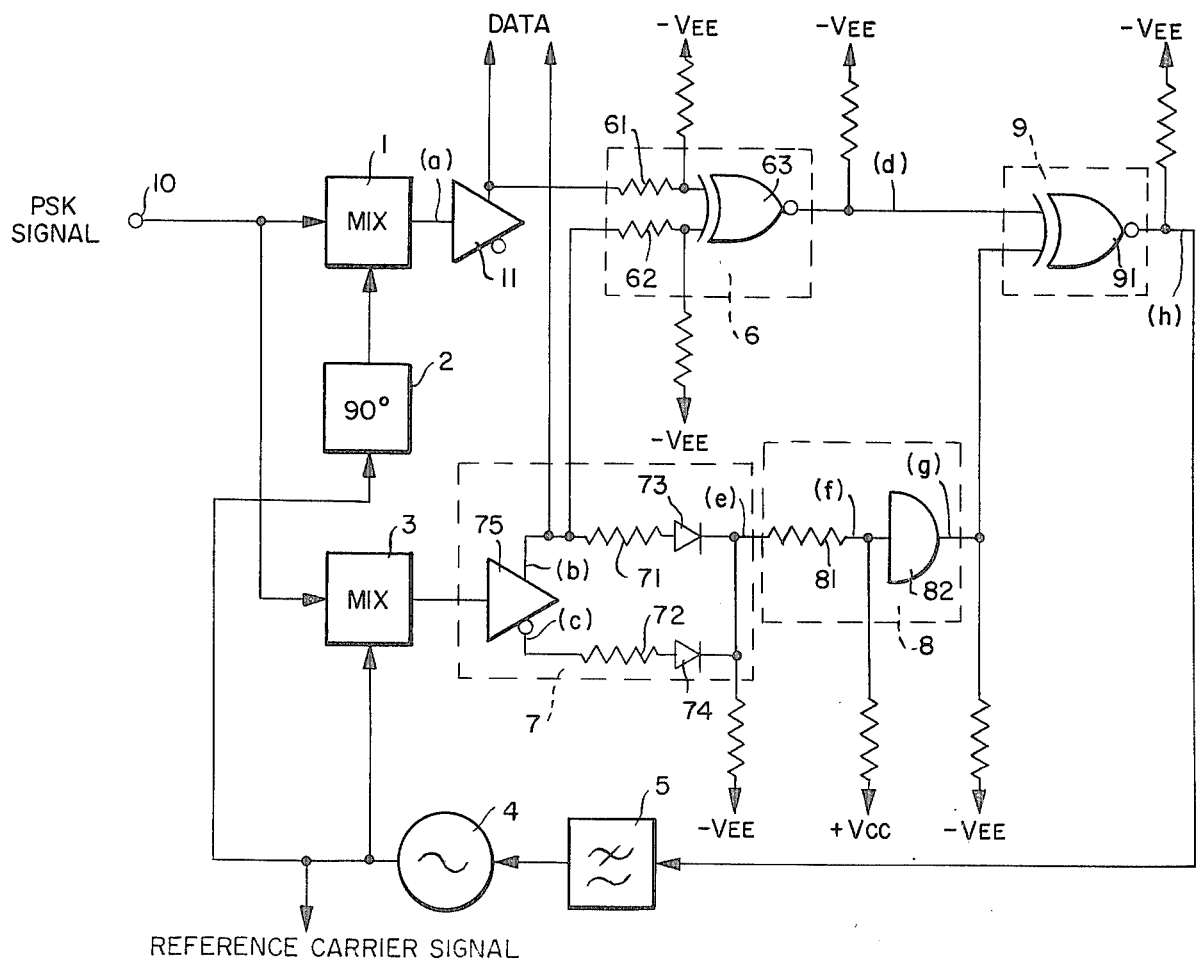
FIG. 2 is a detailed circuit structure of the carrier-recovery circuit shown in FIG. 1.

As is obvious from the above explanation, the first multiplier means (×2) 6 shown in FIG. 1 corresponds to the resistors 61, 62 and the EX-OR circuit 63 in FIG. 2, while the full-wave rectifying means 7 corresponds to the differential amplifier 75, resistors 71, 72 and rectifying diodes 73, 74. The waveform transforming means 8 corresponds to the resistor 81 and the amplifier 82; and the second multiplier means (×2) 9 corresponds to the EX-OR gate circuit 91.

In the embodiment shown in FIG. 2, when the inputs proportional to sin θ and cos θ are input to the EX-OR and processed, an output proportional to −sin 2θ is obtained. Therefore the output of the EX-OR gate circuit 63 is inverted and an output proportional to sin 2θ is obtained. The output sin 2θ is applied to the EX-OR gate circuit 91.

Moreover, the level of the output cos 2θ is adjusted by the level adjusting resistor 81 but it is also possible to omit such a resistor and give such function to the resistors 71 and 72 provided in the preceding stage of the rectifying diode.

As explained above, according to this invention, cos 2θ can easily be generated from cos θ using the full-wave rectifying means 7 and the waveform transforming means 8. Therefore, the present invention provides a simplified circuit structure without a plurality of square circuits (or a plurality of full-wave rectifying means) and subtraction (or addition) means which have been used in existing carrier recovery-circuits.

In addition, the above full-wave rectifying means 7 and waveform transforming means 8, used in the carrier-recovery circuit of the invention, can be formed with a smaller number of differential amplifiers, level adjusting resistors and rectifying diodes, reflecting a remarkable effect from an economical viewpoint, including expenses, required in the manufacturing processes.

Moreover, this invention can be realized with a simple circuit structure which is easily adjustable and has improved characteristics and and high stability.

What is claimed is:

1. A carrier-recovery circuit, operatively connected to receive a phase shift keying (psk) signal, having a locally generated signal, comprising:
    an input terminal for receiving the psk signal;
    mixing means, operatively connected to said input terminal, for mixing the phase shift keying (psk) signal with the locally generated signal to provide first and second baseband outputs in phase quadrature with each other;
    first multiplier means, operatively connected to said mixing means, for receiving the first and second baseband outputs of said mixing means, frequency multiplying the first and second baseband outputs of said mixing means and providing a first multiplied output signal;

full-wave rectifying means, operatively connected to said mixing means, for receiving and full-wave rectifying the second baseband output of said mixing means and providing an absolute value output signal;

transforming means, operatively connected to said full-wave rectifying means, for receiving the absolute value output signal and providing a level shifted output signal of the absolute value output signal;

second multiplier means, operatively connected to said first multiplier means and said transforming means, for frequency multiplying the first multiplied output signal of said first multiplier means with the level shifted output signal of said transforming means and outputting a second multiplied output signal;

a loop filter, operatively connected to said second multiplier means, for receiving the second multiplied output signal; and a voltage controlled oscillator, operatively connected to said loop filter, for generating the locally generated signal.

2. A circuit according to claim 1, wherein said first multiplier means comprises:

an exclusive-OR (EX-OR) gate circuit having first and second input terminals and a threshold voltage, for providing the first multiplied output signal; and level-shifting means, operatively connected to said first and second input terminals of said EX-OR gate circuit and operatively connected to said mixing means, for receiving and level-shifting the first and second baseband outputs of said mixing means to match the threshold voltage of said EX-OR gate circuit.

3. A circuit according to claim 2, wherein said level-shifting means are resistors connected in series with said exclusive OR gate.

4. A circuit according to claim 1, wherein said second multiplier means is an exclusive-OR (EX-OR) gate circuit.

5. A circuit according to claim 1, wherein said full-wave rectifying means comprises:

a differential amplifier, operatively connected to said mixing means, for receiving the second baseband output of said mixing means and providing two outputs, having a 90 degree phase difference between them, in accordance with the second baseband output;

two rectifying diodes, operatively connected to said differential amplifier, for receiving and rectifying the two outputs of said differential amplifier and providing rectified output signals thereof; and combining means, operatively connected to said two rectifying diodes, for receiving the rectified output signals and providing a full-wave rectified signal of the rectified output signals.

6. A circuit according to claim 1, wherein said transforming means comprises:

amplifier means having an input terminal, operatively connected to said full-wave rectifying means, for amplifying the absolute value output signal of said full-wave rectifying means; and level-shifting means, operatively connected between said input terminal of said amplifier means and said full-wave rectifying means, for level shifting the absolute value output signal of said full-wave rectifying means, wherein said second multiplier means comprises an exclusive-OR (EX-OR) gate circuit having a threshold level and wherein the absolute value output signal of said full-wave rectifying means is level shifted to match the threshold level of said exclusive-OR gate circuit.

* * * * *

UNITED STATES PATENT AND TRADEMARK OFFICE
CERTIFICATE OF CORRECTION

PATENT NO. : 4,475,218
DATED : OCTOBER 2, 1984
INVENTOR(S) : KOICHIRO TAKEDA ET AL.

It is certified that error appears in the above-identified patent and that said Letters Patent is hereby corrected as shown below:

Col. 1, line 18, "processing" should be --process--;
      line 32, "a" should be --the--;
      line 32, "the" should be --a--;
      line 32, "(cos 2)" should be --cos 2$\theta$)--;
      line 36, "40" should be --4$\theta$--;
      line 63, "know" should be --known--.

Col. 2, line 5, "40" should be --4$\theta$--.

Col. 3, line 32, delete "in".

Col. 4, line 52, delete "and" (first occurrence);
      line 55, "(psk)" should be --(PSK)--;
      line 57, "psk" should be --PSK--;
      line 59, "(psk)" should be --(PSK)--.

Signed and Sealed this

Thirtieth Day of April 1985

[SEAL]

*Attest:*

DONALD J. QUIGG

*Attesting Officer*     *Acting Commissioner of Patents and Trademarks*